United States Patent
Terada

(10) Patent No.: US 11,242,441 B2
(45) Date of Patent: Feb. 8, 2022

(54) BIODEGRADABLE RESIN MOLDED PRODUCT, METHOD FOR PRODUCING THE SAME, AND PELLETS USED THEREFOR

(71) Applicant: TBM CO., LTD., Tokyo (JP)

(72) Inventor: Takahiko Terada, Kyoto (JP)

(73) Assignee: TBM CO., LTD., Tokyo (JP)

( * ) Notice: Subject to any disclaimer, the term of this patent is extended or adjusted under 35 U.S.C. 154(b) by 0 days.

(21) Appl. No.: 17/056,905

(22) PCT Filed: Sep. 11, 2019

(86) PCT No.: PCT/JP2019/035780
§ 371 (c)(1),
(2) Date: Nov. 19, 2020

(87) PCT Pub. No.: WO2020/084945
PCT Pub. Date: Apr. 30, 2020

(65) Prior Publication Data
US 2021/0238383 A1    Aug. 5, 2021

(30) Foreign Application Priority Data
Oct. 26, 2018  (JP) .............. JP2018-202229

(51) Int. Cl.
| | | |
|---|---|---|
| *C08K 3/26* | (2006.01) | |
| *B29C 48/00* | (2019.01) | |
| *B29C 48/08* | (2019.01) | |
| *B29C 45/00* | (2006.01) | |
| *C08L 67/04* | (2006.01) | |
| *B29K 67/00* | (2006.01) | |
| *B29K 509/02* | (2006.01) | |
| *B29L 7/00* | (2006.01) | |
| *B29L 31/00* | (2006.01) | |

(52) U.S. Cl.
CPC ............ *C08K 3/26* (2013.01); *B29C 45/0001* (2013.01); *B29C 48/022* (2019.02); *B29C 48/08* (2019.02); *C08L 67/04* (2013.01); *B29K 2067/046* (2013.01); *B29K 2509/02* (2013.01); *B29K 2995/006* (2013.01); *B29L 2007/002* (2013.01); *B29L 2031/712* (2013.01); *C08K 2003/265* (2013.01); *C08K 2201/003* (2013.01); *C08K 2201/005* (2013.01); *C08K 2201/006* (2013.01); *C08K 2201/018* (2013.01)

(58) Field of Classification Search
None
See application file for complete search history.

(56) References Cited

U.S. PATENT DOCUMENTS

| | | | |
|---|---|---|---|
| 2008/0064812 A1 | 3/2008 | Narayan et al. | |
| 2011/0172326 A1* | 7/2011 | Weismann | ............... C08L 3/02 523/128 |
| 2011/0275749 A1 | 11/2011 | Uyama et al. | |
| 2017/0362396 A1* | 12/2017 | Minami | .................. B29B 7/002 |

FOREIGN PATENT DOCUMENTS

| | | |
|---|---|---|
| CN | 102282194 A | 12/2011 |
| JP | H1052870 A | 2/1998 |
| JP | H11028776 A | 2/1999 |
| JP | 2001348498 A | 12/2001 |
| JP | 2002264967 A | 9/2002 |
| JP | 2002371201 A | 12/2002 |
| JP | 2003041142 A | 2/2003 |
| JP | 2004532901 A | 10/2004 |
| JP | 2007255089 A | 10/2007 |
| JP | 2010006885 A | 1/2010 |
| JP | 2013022803 A | 2/2013 |
| JP | 2015063008 A | 4/2015 |
| JP | 2008255134 A | 10/2018 |
| WO | 2002046277 A1 | 6/2002 |
| WO | 2010082639 A1 | 7/2010 |
| WO | 2013129668 A1 | 9/2013 |

OTHER PUBLICATIONS

Datasheet for heavy calcium "What is the difference between light calcium and heavy calcium?" (Year: 2017).*
Datasheet for Omya OMYACARB UTF-FL Calcium Carbonate p. 1-2.*
International Search Report for International Application No. PCT/JP2019/035780; dated Nov. 19, 2019.

* cited by examiner

*Primary Examiner* — Robert T Butcher
(74) *Attorney, Agent, or Firm* — Cantor Colburn LLP

(57) ABSTRACT

Provided is a biodegradable resin molded product that exhibits excellent processability and sufficient strength as the molded product, is advantageous in terms of cost and at the same time, has excellent biodegradability under an environment, in particular, marine biodegradability, and a method for producing the same, and pellets used therefor. The molded product is produced using a biodegradable resin composition including a biodegradable resin and heavy calcium carbonate particles in a range by mass of 50:50 to 10:90.

14 Claims, No Drawings

BIODEGRADABLE RESIN MOLDED PRODUCT, METHOD FOR PRODUCING THE SAME, AND PELLETS USED THEREFOR

CROSS REFERENCE TO RELATED APPLICATIONS

This is the U.S. national stage of application No. PCT/JP2019/035780, filed on Sep. 11, 2019. Priority under 35 U.S.C. § 119(a) and 35 U.S.C. § 365(b) is claimed from Japanese Application No. 2018-202229 filed Oct. 26, 2018, the disclosure of which is also incorporated herein by reference.

FIELD

The present invention relates to a biodegradable resin molded product, a method for producing the same, and pellets used therefor. More specifically, the present invention relates to a biodegradable resin molded product having excellent biodegradability under an environment, particularly marine biodegradability, a method for producing the same, and pellets used therefor.

BACKGROUND

Conventionally, biodegradable resins represented by polylactic acid have attracted attention as environmentally friendly resins because the resins turn into substances that originally exist in nature due to actions such as hydrolysis under the environment and microbial metabolism, and are resins that are widely used and expected to be more widely used in the future.

Polylactic acid has a mechanical strength comparable to general-purpose plastics but has poor heat resistance as compared with petrochemical polyesters represented by polyethylene terephthalate and polybutylene terephthalate. In addition, polylactic acid has relatively excellent hardness but lacks flexibility and processability and is inferior in lightness due to a high specific gravity.

Generally, the biodegradable resins have high production cost and are expensive in price. This issue is a major issue in order to replace the petrochemical plastics and spread the biodegradable resins.

Furthermore, although the molded products including the biodegradable resins such as polylactic acid are said to have biodegradability, hydrolysis reaction, which is a rate-determining step, is relatively slow, particularly near room temperature. Therefore, long time is required until microorganisms turn the molded product into resources. In particular, with respect to the molded product such as containers, the decomposition due to the action of an enzyme proceeds from the surface of the molded product, and thus it takes significant time to completely decompose the biodegradable resin forming the molded product. Consequently, the property of biodegradability is not fully utilized and there is much room for improvement, particularly in the case where marine pollution and the like are considered.

As described above, many problems still remain in the spread of the products that use the biodegradable resins and various researches and developments have been made until now. Although the problems that each researcher studies are different from each other, as one of the directions of their studies, techniques have been developed in which filler particles are blended with the biodegradable resin and voids between the filler particles and the biodegradable resin matrix are formed by applying stretching after this composition in which the filler particles are blended with the biodegradable resin is formed into a sheet-like product.

For example, Patent Literature 1 discloses, as a breathable film used in the medical field, a breathable film having characteristics in that the film includes the mixture of filler particles and a biodegradable resin and voids are formed around the filler particles by stretching to facilitate permeation of water vapor. In this Patent Literature 1, the filler particles are mainly used for forming voids of closed cells around the particles by stretching, that is, for forming the voids having gas permeability but no liquid permeability.

Patent Literature 2 discloses a heat-shrinkable film formed by stretching a film including a polylactic acid-based resin as a main component, a thermoplastic resin incompatible with the polylactic acid-based resin as another component, and a filler in at least one direction, in which a porosity after stretching is 5% or more and less than 24% and a shrinkage ratio in the main shrinkage direction is 20% or more when the film is immersed in warm water of 80° C. for 10 seconds. In this Patent Literature 2, the voids are assumed to be formed by stretching at the interface between the polylactic acid-based resin and the thermoplastic resin which is incompatible with the polylactic acid-based resin and the filler is used for the purpose of assisting in exhibiting a light-shielding property due to the voids.

Patent Literature 3 discloses a polylactic acid-based film including a first layer including a polylactic acid-based resin and a filler, and a second layer including a polylactic acid-based resin as a main component on at least one surface of the first layer, in which an apparent specific gravity of the entire film is 1.1 g/cm$^3$ or less. In Patent Literature 3, the filler is also used to form voids around the particles by stretching and to reduce the weight by forming the voids.

Patent Literature 4 discloses a polylactic acid-based packing band characterized in that a resin composition including polylactic acid including crystalline polylactic acid as a main component, a plasticizer, and an inorganic filler as constituents is stretched in the lengthwise direction, and whereby voids exist due to interfacial peeling between the surface of the inorganic filler and the polylactic acid caused by this stretching. In Patent Literature 4, use of the polylactic acid including the crystalline polylactic acid as the main component provides biodegradability and nerve strength, and blend of the plasticizer provides flexibility by promoting plasticizing the polylactic acid. In addition, blending an inorganic filler and stretching the resin composition in the lengthwise direction provide further flexibility by forming voids due to interfacial peeling between the surface of the inorganic filler and the polylactic acid caused by this stretching. The inorganic filler is also assumed to provide an effect as a lubricant.

Patent Literature 5 proposes a masterbatch obtained by uniformly blending filler particles having an average particle diameter of 0.5 to 40 μm in a large amount of 50% by mass to 75% by mass relative to a specific biodegradable resin. This masterbatch is assumed to be used for uniformly blending the filler in the molded product including the biodegradable resin composition made by blending the filler particles at 45% by mass or less.

As described above, in the techniques disclosed in Patent Literatures 1, 3, and 4, the voids are formed around the filler particles by blending the filler particles with the biodegradable resin and stretching the resultant composition to improve, for example, the weight reduction, flexibility, and gas permeability of the resin product. In the technique disclosed in Patent Literature 2, the filler particles are also used for only substantially functioning as a light-shielding auxiliary agent. Therefore, the amount of the filler particles blended in the biodegradable resin composition are relatively small and thus improvement in biodegradability under an environment and improvement in heat resistance cannot be expected. The technique as described in Patent Literature 5 is an effective method for uniformly dispersing the filler in the biodegradable resin in order to obtain a biodegradable resin composition by blending filler particles in an amount of 45% by mass or less. However, this technique merely utilizes the masterbatch method for achieving general uniform blend of additives. Similarly to the above described techniques, this technique also cannot be expected to improve biodegradability under the environment and improve heat resistance. In Patent Literature 5, talc is exemplified as preferable filler particles and is used in disclosed Examples. However, silicate mineral particles such as talc and mica have been known as mineral particles that promote crystallization of polylactic acid by strongly acting as crystal nucleating agents. These mineral particles have one aspect in which improvement in heat resistance can be expected. In contrast, moldability and biodegradability tend to deteriorate.

CITATION LIST

Patent Literature

Patent Literature 1: Japanese Translation of PCT International Patent Application Publication No. 2004-532901
Patent Literature 2: Japanese Patent Application Laid-open No. 2008-255134
Patent Literature 3: Japanese Patent Application Laid-open No. 2013-022803
Patent Literature 4: Japanese Patent Application Laid-open No. 2002-264967
Patent Literature 5: US Patent Application Publication No. 2008-0064812

SUMMARY

Technical Problem

The present invention has been made in view of the above circumstances and an object of the present invention is to provide a biodegradable resin molded product in which an inorganic substance powder is blended that exhibits excellent processability and sufficient strength as the molded product, is advantageous in terms of cost, and at the same time, has excellent biodegradability under an environment, in particular, marine biodegradability, a method for producing the same, and pellets used therefor.

Solution to Problem

The inventors of the present invention have conducted extensive studies and investigations in order to solve the above-described problems. As a result, the inventors of the present invention have found that, in order to enhance the biodegradability of the product including the biodegradable resin, it is remarkably effective that heavy calcium carbonate particles, that is, calcium carbonate particles obtained by mechanically crushing and classifying a natural raw material mainly composed of $CaCO_3$ such as limestone, are used as a filler or an inorganic substance powder to be blended to the biodegradable resin, and the heavy calcium carbonate particles are blended in a range of 50% by mass or more of the entire composition. More specifically, it has been found that, in a molded product molded using the biodegradable resin composition in which the heavy calcium carbonate particles are blended in a large amount, there is a state where a large number of fine voids around which the biodegradable resin does not adhere to the surface of the heavy calcium carbonate particles are formed or a state where a large number of parts in which adhesion is significantly weak exist, immediately after molding the molded product at the interface of the biodegradable resin constituting the matrix and the heavy calcium carbonate particles even without applying treatment such as stretching, in particular, at the time of molding because the heavy calcium carbonate particles have a large specific surface area due to amorphous shape or the like originated from the production history thereof. As a result, in the molded product, it is presumed that the surface area of the biodegradable resin becomes significantly large in addition to the large amount of the heavy calcium carbonate particles to be blended in the composition, and thus the field of decomposition of the molded product caused by the action of enzymes is dramatically increased, resulting in improving biodegradability.

In the case where the heavy calcium carbonate particles are blended as the filler, generation of calcium oxide caused by partially oxidizing calcium carbonate at the surface part of the heavy calcium carbonate particles due to the heat history during the molding of the biodegradable resin composition, has been confirmed. The hydrolysis of the biodegradable macromolecule compound may be accelerated by turning calcium oxide into calcium hydroxide with heat generation by contacting the calcium oxide with water to generate physical cracks in the molded product molded from the biodegradable resin composition and thus more easily triggering shape collapse, and in addition to this, by the basic catalytic effect of this calcium hydroxide. For example, blend of calcium oxide particles themselves with the biodegradable resin composition results in difficulty in molding the product itself due to excessively high reaction and the stability of the molded product as the product is also insufficient.

The heavy calcium carbonate particles can be produced from raw materials existing in a large amount in nature and thus no problem arises in the blend of the heavy calcium carbonate particles with the biodegradable resin from the viewpoint of environments. In addition, it has been found that the physical properties such as mechanical strength and heat resistance are improved and more advantage in terms of cost is achieved by blending the heavy calcium carbonate particles in a large amount relative to the biodegradable resin, and thus the present invention has been achieved.

In other words, the present invention for solving the above-described problems provides a biodegradable resin molded product, including: a biodegradable resin composition, in which the biodegradable resin composition includes a biodegradable resin and heavy calcium carbonate particles in a range by mass of 50:50 to 10:90.

In one aspect of the biodegradable resin molded product according to the present invention, the biodegradable resin molded product in which an average particle diameter of the heavy calcium carbonate particles is 1.0 μm or more and 10.0 μm or less is described.

In one aspect of the biodegradable resin molded product according to the present invention, the biodegradable resin molded product in which a BET specific surface area of the heavy calcium carbonate particles is 0.1 $m^2/g$ or more and 10.0 $m^2/g$ or less is further described.

In one aspect of the biodegradable resin molded product according to the present invention, the biodegradable resin molded product in which a roundness of the heavy calcium carbonate particles is 0.50 or more and 0.95 or less is described.

In one aspect of the biodegradable resin molded product according to the present invention, the biodegradable resin molded product in which the heavy calcium carbonate particles are particles with their surface part partially oxidized is described.

In one aspect of the biodegradable resin molded product according to the present invention, the biodegradable resin molded product in which the biodegradable resin include polylactic acid is described.

In one aspect of the biodegradable resin molded product according to the present invention, the biodegradable resin molded product including a biodegradable resin composition in which the biodegradable resin includes poly(L-lactic acid) having a weight average molecular weight (Mw) of 50,000 or more and 300,000 or less in a range of 10 to 100% by mass of entire resin components, is described.

In one aspect of the biodegradable resin molded product according to the present invention, the molded product in which the molded product has a laminated structure formed by covering at least one surface of a layer including the biodegradable resin composition including the biodegradable resin and the heavy calcium carbonate particles in a range by mass of 50:50 to 10:90 with a surface layer including the biodegradable resin, is described.

In one aspect of the biodegradable resin molded product according to the present invention, the biodegradable resin molded product in which the molded product is a sheet is described.

In one aspect of the biodegradable resin molded product according to the present invention, the biodegradable resin molded product in which the molded product is a container product is described.

The present invention to solve the above-described problems is also achieved by a method for producing a molded product, the method including: molding a biodegradable resin composition including a biodegradable resin and heavy calcium carbonate particles in a range by mass of 50:50 to 10:90 at a temperature of 10 to 100° C.

In one aspect of the method for producing the molded product according to the present invention, the method for producing the molded product in which the molding is performed without stretching treatment is described.

In one aspect of the method for producing the molded product according to the present invention, the method for producing the molded product in which the biodegradable resin composition is melted and kneaded with a twin-screw extruder at 140 to 220° C. and thereafter molded into a sheet-like product using a T-die, is described.

In one aspect of the method for producing the molded product according to the present invention, the method for producing the molded product in which the biodegradable resin composition is melted and kneaded with a twin-screw extruder at 140 to 220° C. and thereafter molded by injecting into a mold maintained at a mold temperature of 20 to 120° C., is also described.

The present invention for solving the above-described problems is also achieved by pellets, including: a biodegradable resin composition in which the biodegradable resin composition includes a biodegradable resin and heavy calcium carbonate particles in a range by mass of 50:50 to 10:90.

Advantageous Effects of Invention

According to the present invention, with respect to the molded product molded from the biodegradable resin composition, a molded product in which biodegradability under an environment, in particular, marine biodegradability is significantly improved, while excellent processability, and mechanical strength, heat stability, and other properties of the product are sufficiently secured, can be provided with an economical advantage.

DESCRPTION OF EMBODIMENTS

Hereinafter, the present invention will be described in detail based on embodiments.

Biodegradable Resin Composition

The biodegradable resin molded product according to the present invention includes a biodegradable resin composition including a biodegradable resin and heavy calcium carbonate particles in a range by mass of 50:50 to 10:90. First, each component constituting the biodegradable resin composition will be described in detail.

Biodegradable Resin

Examples of the biodegradable resin used in the present invention include aliphatic polyester resins such as polyhydroxybutyrate, poly(3-hydroxybutyrate-co-3-hydroxyhexanoate) (PHBH), polycaprolactone, polybutylene succinate (PBS), polybutylene succinate/adipate (PBSA), polyethylene succinate (PBA), polylactic acid (PLA), polymalic acid, polyglycolic acid (PGA), polydioxanone, and poly(2-oxetanone); aliphatic-aromatic copolymer polyester resins such as polybutylene terephthalate/succinate (PETS), polybutylene adipate/terephthalate (PBAH), and polytetramethylene adipate/terephthalate; and mixtures of the aliphatic polyester resin or the aliphatic-aromatic copolyester resin and a natural macromolecule such as starch, cellulose, chitin, chitosan, gluten, gelatin, zein, soybean protein, collagen, and keratin. Of these, the aliphatic polyester resins are preferable from the viewpoints of processability, economic efficiency, and easy availability, and polylactic acid is particularly preferable.

In the present specification, the term "polylactic acid" includes not only a polylactic acid homopolymer obtained by polycondensing a lactic acid component alone as a raw material monomer but also a polylactic acid copolymer obtained by using the lactic acid component with other monomer components that can be copolymerized with the lactic acid component as raw material monomers, and polycondensing these monomer components.

The other monomer components copolymerizable with lactic acid are not particularly limited and examples include oxyacids, divalent alcohols or polyvalent alcohols having a valence of three or more, aromatic hydroxy compounds, divalent carboxylic acids or polyvalent carboxylic acids having a valence of three or more, and lactones.

Examples of the oxyacids include glycolic acid, hydroxypropionic acid, hydroxybutyric acid, hydroxyvaleric acid, hydroxypentanoic acid, hydroxycaproic acid, hydroxybenzoic acid, and hydroxyheptanoic acid. Of these oxiacids, glycolic acid and hydroxycaproic acid are preferable.

Examples of the divalent alcohols include ethylene glycol, propylene glycol, propanediol, butanediol, heptanediol, hexanediol, octanediol, nonanediol, decanediol, 1,4-cyclohexanedimethanol, neopentyl glycol, diethylene glycol, triethylene glycol, polyethylene glycol, and polytetramethylene glycol. Examples of the polyvalent alcohols having a valence of three or more include glycerin, trimethylolpropane, and pentaerythritol.

Examples of the aromatic hydroxy compounds include hydroquinone, resorcin, and bisphenol A.

Examples of the divalent carboxylic acids include oxalic acid, succinic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalene dicarboxylic acid, bis(4-carboxyphenyl)methane, anthracene dicarboxylic acid, bis(4-carboxyphenyl) ether, and sodium 5-sulfoisophthalate. Examples of the polyvalent carboxylic acids having a valence of three or more include trimellitic acid and pyromellitic acid.

Examples of the lactones include caprolactone, valerolactone, propiolactone, undecalactone, and 1,5-oxepane-2-one.

The components other than lactic acid contained in polylactic acid can be copolymerized within a range that does not impair the original biodegradability of polylactic acid. The amount proportion thereof is desirably 20% by mole or less, preferably 0% by mole to 10% by mole, and more preferably 0% by mole to 5% by mole of the entire constituents.

Polylactic acid has asymmetric carbons in the main chain and thus crystalline poly(L-lactic acid) and poly(D-lactic acid) with an optical purity of 100%, amorphous poly(DL-lactic acid) with an optical purity of 0%, and poly-lactic acid with an optical purity in between, exist even in the case of the homopolymer consisting of lactic acid units alone.

In addition, formation of stereocomplex polylactic acid by mixing poly(L-lactic acid) and poly(D-lactic acid) in a solution or a molten state has also been known. A block copolymer including a poly(L-lactic acid) block and a poly(D-lactic acid) block has also been known.

In the present invention, the polylactic acid used as the biodegradable resin composition may be any of these polylactic acids. From the viewpoint of properties such as heat resistance, impact strength, flexibility, or elasticity which are desired in the molded product to be obtained, the polylactic acids having suitable properties can be appropriately used.

Hereinafter, each type of the polylactic acids that can be used as the biodegradable resin in the present invention will be described in more detail for facilitating more understanding. The polylactic acid or the biodegradable resin that can be used in the present invention, however, is not limited to the exemplified description described below.

Poly(L-Lactic Acid) and Poly(D-Lactic Acid)

Poly(L-lactic acid) or poly(D-lactic acid) can be produced by, for example, a direct melt polymerization method, a solid phase polymerization method, a direct condensation polymerization method of lactic acid, and a melt ring-opening polymerization method of lactide. Of these methods, the melt ring-opening polymerization of lactide is economically preferable. At the time of producing poly(L-lactic acid) or poly(D-lactic acid) by the melt ring-opening polymerization method, L-lactide and D-lactide are used to introduce the L-form and D-form of lactic acid, respectively.

D-Lactide or D-lactic acid, which is a raw material of poly(D-lactic acid) unit, has a limited supply source and a small amount of distribution and market price of D-lactide or D-lactic acid is higher than that of L-lactide or L-lactic acid, which is a raw material of poly(L-lactic acid) unit. Consequently, use of poly(L-lactic acid) is preferable from the economical point of view in the aspect where crystalline polylactic acid is used.

In the polycondensation of poly(D-lactic acid) or poly(L-lactic acid), to D-lactide or D-lactic acid serving as a raw material of poly(D-lactic acid) unit or L-lactide or L-lactic acid serving as a raw material of poly(L-lactic acid) unit, a lactic acid component serving as a raw material of a symmetric lactic acid unit (that is, L-lactide or L-lactic acid in the case of poly(D-lactic acid), and, on the other hand, D-lactide or D-lactic acid in the case of poly(L-lactic acid)) and other copolymerizable monomer components as described above can be blended to the extent that crystallinity of poly(D-lactic acid) or poly(L-lactic acid) is not significantly impaired, for example, 1% by mole or less relative to all constituents, and copolymerized.

Examples of the production of poly(D-lactic acid) or poly(L-lactic acid) by the melt ring-opening polymerization method include production in which melt ring-opening polymerization of D-lactide or L-lactide having an optical purity of 90% to 100% is performed in the presence of an alcohol-based initiator and a metal catalyst, and the synthesis is performed in the system in which the catalyst deactivator is added in an amount of 0.3 to 20 equivalents per equivalent of the metal element of the metal catalyst.

Examples of the preferable metal catalyst include fatty acid salts, carbonates, sulfates, phosphates, oxides, hydroxides, halides, and alcoholates of alkali metals, alkaline earth metals, rare earth metals, transition metals, aluminum, germanium, tin, antimony, and titanium. Of these metal catalysts, the fatty acid salts, carbonates, sulfates, phosphates, oxides, hydroxides, halides, and alcoholates of at least one metal selected from tin, aluminum, zinc, calcium, titanium, germanium, manganese, magnesium, and rare earth elements are preferable. These catalysts may be used alone or, in some cases, may be used in combination of two or more of the catalysts. The amount of the catalyst to be used is about $0.4 \times 10^{-4}$ to about $100.0 \times 10^{-4}$ mol per 1 kg of the lactide.

Examples of the deactivator used for the catalyst deactivation of the melt ring-opening polymerized polylactic acid in the presence of the metal catalyst include phosphoric acid, phosphorous acid, hypophosphorous acid, pyrophosphoric acid, trimetaphosphoric acid, tetrametaphosphoric acid, phenylphosphonic acid, benzylphosphinic acid, dibutyl phosphate, dinonyl phosphate, N'-bis(salicylidene)ethylenediamine, and N,N'-bis(salicylidene)propanediamine. Of these deactivators, phosphoric acid, phosphorous acid, and pyrophosphoric acid are preferable. These deactivators may be used singly or, in some cases, may be used in combination of two or more of the deactivators. The amount of the deactivator to be used is in the range of about 0.4 to about 15.0 equivalents per equivalent of the metal element.

Examples of the alcohol-based initiator include aliphatic monovalent alcohols having a carbon number of 1 to 22 such as methanol, ethanol, n-propyl alcohol, n-butyl alcohol, sec-butyl alcohol, pentyl alcohol, n-hexyl alcohol, cyclohexyl alcohol, octyl alcohol, nonyl alcohol, 2-ethylhexyl alcohol, n-decyl alcohol, n-dodecyl alcohol, hexadecyl alcohol, lauryl alcohol, ethyl lactate, and hexyl lactate; aliphatic polyvalent alcohols having a carbon number of 1 to 20 such as ethylene glycol, propylene glycol, propanediol, butanediol, pentanediol, hexanediol, octanediol, glycerin, sorbitan, neopentyl glycol, trimethylolpropane, and pentaerythritol; poly alkylene glycols such as diethylene glycol, triethylene glycol, polyethylene glycol, polypropylene glycol, and in addition, ethylene oxide adducts of phenols, and ethylene glycol adduct of bisphenol. Of these alcohol-based initiators, stearyl alcohol, lauryl alcohol, ethylene glycol, propanediol, butanediol, hexanediol, polyethylene glycol, polypropylene glycol, and the like are preferable from the viewpoint of reactivity and physical properties of polylactide.

The amount of alcohol initiator to be used is primarily determined by considering a desired weight average molecular weight (Mw). For example, in the case of a monovalent alcohol, when polylactic acid having Mw of about 70,000 to about 110,000 is produced, 0.009 to 0.030 mol, and particularly preferably 0.014 to 0.021 mol of the alcohol initiator is used relative to 1 kg of lactide. Further, when polylactic acid having Mw of about 100,000 to about 200,000 is produced, 0.009 to 0.020 mol, particularly preferably 0.010 to 0.018 mol of the alcohol initiator is used relative to 1 kg of lactide. In the present specification, the weight average molecular weight (Mw) is a weight average molecular weight value in terms of standard polystyrene by gel permeation chromatography (GPC) measurement using chloroform as an eluent.

In accordance with the conventionally known method, the mixture of the lactide, the catalyst, and the alcohol-based initiator can be polymerized by a continuous or batch process using a vertical polymerization vessel, a horizontal polymerization vessel, a tubular polymerization vessel, or a combination thereof in a temperature range of 180 to 230° C. for a reaction time of 2 to 10 hours while the heat of the reaction is being removed.

Generally, the thus obtained poly(D-lactic acid) or poly (L-lactic acid) has a melting point of about 165° C. to about 185° C. and a glass transition point (Tg) of about 55 to about 60° C. The weight average molecular weight (Mw) is not particularly limited as long as, when the molded product for the target application, for example, an extrusion molded product or an injection molded product is produced, the molded product exhibits substantially sufficient mechanical properties. Generally, poly(D-lactic acid) or poly(L-lactic acid) having a low molecular weight causes the strength of the obtained molded product to be lowered and the decomposition rate to be rapid, whereas poly(D-lactic acid) or poly(L-lactic acid) having a high molecular weight allows the strength to be improved but causes the processability to be deteriorated, resulting in difficulty in molding. Therefore, the weight average molecular weight (Mw) is preferably 50,000 or more and 300,000 or less and more preferably 100,000 or more and 200,000 or less.

Poly(DL-Lactic Acid)

Poly(DL-lactic acid) is a random copolymer including the L-lactic acid units and the D-lactic acid units. The ratio of the L-lactic acid unit to the D-lactic acid unit is not particularly limited. In view of providing an amorphous property and flexibility, L-lactic acid unit/D-lactic acid unit is desirably about 60/40 to about 40/60 and more preferably about 55/45 to about 45/55. As described above, D-lactide or D-lactic acid serving as the raw material of the D-lactic acid unit has a limited supply source, a small amount of distribution, and has higher market price as compared with L-lactide or L-lactic acid serving as the raw material of the poly(L-lactic acid) unit. Consequently, the blended amount of the L-lactic acid unit larger than the blended amount of the D-lactic acid unit is economically preferable even when poly(DL-lactic acid) is produced.

In the polycondensation of poly(DL-lactic acid), the other monomer components copolymerizable with the lactic acid component as described above can be copolymerized by blending the other monomer components in a range not significantly impairing the properties such as biodegradability of poly(DL-lactic acid), for example, in a range of 20% by mole or less of the entire constituents.

As the method for producing poly(DL-lactic acid), similar to the case of poly(L-lactic acid) and poly(D-lactic acid) described above, poly(DL-lactic acid) may be produced by, for example, the direct melt polymerization method, the solid phase polymerization method, the direct polycondensation method of lactic acid, and the melt ring-opening polymerization method of lactide. Basically, poly(DL-lactic acid) can be obtained in the same method as the above-described production of poly(L-lactic acid) or poly(D-lactic acid) except that the mixture of L-lactic acid or L-lactide or D-lactic acid or D-lactide in the predetermined mixing ratio described above is used instead of single use of L-lactic acid or L-lactide or D-lactic acid or D-lactide for introducing L-form or D-form of lactic acid serving as the raw material, respectively.

The glass transition point (Tg) of poly(DL-lactic acid) is preferably 45 to 60° C. and more preferably 50 to 60° C. Poly(DL-lactic acid) is amorphous and thus has no melting point. The weight average molecular weight (Mw) is not particularly limited as long as, when the molded product for the target application, for example, an extrusion molded product or an injection molded product is produced, the molded product exhibits substantially sufficient mechanical properties. Generally, poly(DL-lactic acid) having a low molecular weight causes the strength of the obtained molded product to be lowered and the decomposition rate to be rapid, whereas poly(DL-lactic acid) having a high molecular weight allows the strength to be improved but causes the processability to be deteriorated, resulting in difficulty in molding. Therefore, the weight average molecular weight (Mw) is preferably 50,000 or more and 300,000 or less and more preferably 100,000 or more and 200,000 or less.

Stereocomplex Polylactic Acid

Poly(L-lactic acid) and poly(D-lactic acid) have different stereoregularities from each other and thus when poly(L-lactic acid) and poly(D-lactic) acid are mixed and melted, and thereafter crystallized, a what is called stereocomplex is formed. In general, the stereocomplex product of polylactic acid is prepared from poly(L-lactic acid) and poly(D-lactic acid) as the raw materials. In addition to these poly(L-lactic acid) and poly(D-lactic acid) or instead of one of poly(L-lactic acid) and poly(D-lactic acid), a DL block copolymer of lactic acid described below can be used as the raw material to form the stereocomplex product. The order of the addition of the compounds to the mixing apparatus for forming the stereocomplex product is not limited. Therefore, all the components of 2 to 3 or more components may be charged into the mixing apparatus at the same time or, for example, any one of the compounds may be charged into the mixing apparatus, and thereafter other components may be sequentially charged and mixed. At this time, each compound may be in any shapes such as powders, granules, or pellets.

In the present invention, alternatively, in an aspect in which the resin including such a stereocomplex product of polylactic acid is used as the biodegradable resin, each component such as poly(L-lactic acid), poly(D-lactic acid), or DL block copolymer of polylactic acid may be charged simultaneously into the mixing apparatus to simultaneously form the stereocomplex product and mix with calcium bicarbonate particles at the time of mixing calcium bicarbonate particles as described below and the biodegradable resin.

For the mixing, for example, a mill roll, a mixer, and a single-screw or twin-screw extruder may be used to heat and knead. In other words, the stereocomplex product is formed by melting the mixture above the melting point thereof and then cooling the resultant mixture.

The temperature of the mixture may be within the temperature range in which the components included in the mixture are melted and is generally about 170 to about 250° C. Poly(L-lactic acid), poly(D-lactic acid), and/or the block copolymer describe below is uniformly kneaded by melting and mixing by heating and thereafter the resultant mixture is cooled and crystallized to form a stereocomplex. Although the melted mixture can be crystallized by cooling, the stereocomplex structure and a degree of crystallization may differ depending on the cooling conditions at that time of the cooling. The cooling rate can be appropriately selected depending on, for example, the weight average molecular weight, the mixing ratio, the weight average molecular weight ratio of poly(L-lactic acid), and poly(D-lactic acid), and/or the block copolymer described below used as the raw materials. Generally, the cooling rate is not particularly limited. However, excessively rapid cooling fails to cause crystallization. The cooling is preferably performed at a cooling rate of 20 to 100° C./min. The crystallization temperature is not particularly limited as long as the temperature is equal to or less than the melting point. The higher melting point of the melting points of poly(L-lactic acid) and poly(D-lactic acid) is determined to be the lower limit and melting is performed at a temperature preferably within the range of 50° C., more preferably within the range of 30° C., and particularly preferably in the range of 10 to 20° C. higher than the lower limit value. The pressure at the time of crystallization is not particularly limited and may be normal pressure. The crystallization may also be performed in an atmosphere of an inert gas such as nitrogen and may also be performed under an inert gas flow or under reduced pressure. In order to remove the monomer that is produced by decomposition during melting, the crystallization is preferably performed under reduced pressure. The presence or absence of crystallization can be confirmed by DSC or X-ray diffraction. The melting and mixing time is generally about 2 to about 60 minutes. The melting point rises when the melting and mixing progress sufficiently and the stereocomplex is formed. Depending on the rise of the melting point, gradual rise of the melting temperature to such an extent that the melted mixture is not solidified, is preferable because hardening due to crystallization can be avoided.

The melted mixture can also be molded into a plate or the like by extruding the melted mixture with a single-screw extruder or a twin-screw extruder or the stereocomplex can also be formed by performing a melt molding process such as melt spinning.

At the time of mixing the raw material compounds, a solvent that can dissolve or disperse the raw material compounds may be used. For example, poly(L-lactic acid), poly(D-lactic acid), and the polylactic acid block copolymer may be separately dissolved in each solution and the solvent may be removed after mixing these solutions. After distilling off the solvent, the mixture is heated to melt under the above-described conditions and thereafter cooled to form the stereocomplex. Therefore, the polylactic acid stereocomplex product can also be produced by solution casting in which the mixed solution is cast under heating.

The solvent used for the solution mixing is not particularly limited as long as the solvent can dissolve poly(L-lactic acid), poly(D-lactic acid), and/or the polylactic acid block copolymer. Examples of the solvent include chloroform, methylene chloride, dichloroethane, tetrachloroethane, phenol, tetrahydrofuran, N-methylpyrrolidone, N,N-dimethylformamide, butyrolactone, acetonitrile, 1,4-dioxane, trioxane, and hexafluoroisopropanol. These solvents may preferably be used singly or in combination of two or more of these solvents. The amount of the solvent is 100 to 4,000 parts by weight and preferably 200 to 3,000 parts by weight relative to 100 parts by weight of the total polylactic acid. The mixing may be performed by dissolving each of the polylactic acids in a solvent and mixing the resultant solutions or by dissolving one of the polylactic acids in the solvent and thereafter adding the other and mixing. The solvent can be removed by heating or reducing pressure.

The thus obtained polylactic acid stereocomplex product has a high melting point of 200 to 230° C. and exhibits high crystallinity as compared with poly(L-lactic acid) and poly(D-lactic acid). In the stereocomplex polylactic acid, a homophase may coexist with a complex phase. For exhibiting further heat resistance of the stereocomplex polylactic acid, the stereocomplexation degree (S) defined by the following formula (a) is 80% or more and more preferably 90% or more.

$$S=[\Delta Hmsc/(\Delta Hmh+\Delta Hmsc)]\times 100 \qquad (a)$$

(in Formula (a), Hmh is a heat of crystal fusion of a crystal melting peak of less than 190° C. corresponding to the melting of the homophase crystals in DSC measurement, and ΔHmsc is a heat of crystal fusion of a crystal melting peak of 190° C. or more corresponding to the melting of the complex phase crystals in DSC measurement.

The weight average molecular weight (Mw) is not particularly limited as long as, when the molded product for the target application, for example, an extrusion molded product or an injection molded product is produced, the molded product exhibits substantially sufficient mechanical properties. Generally, stereocomplex polylactic acid having a low molecular weight causes the strength of the obtained molded product to be lowered and the decomposition rate to be rapid, whereas stereocomplex polylactic acid having a high molecular weight allows the strength to be improved but causes the processability to be deteriorated, resulting in difficulty in molding. Therefore, the weight average molecular weight (Mw) is preferably 50,000 or more and 300,000 or less and more preferably 100,000 or more and 200,000 or less.

Polylactic Acid Block Copolymer

The polylactic acid block copolymer is a stereoblock copolymer containing one or more L-lactic acid segments and D-lactic acid segments each. The L-lactic acid segment and the D-lactic acid segment mean a polymer formed of two or more of L-lactic acid or D-lactic acid. The weight average molecular weight (Mw) thereof is not particularly limited. The weight average molecular weight is preferably 500 to 300,000 and more preferably 5,000 to 100,000. The segment having a molecular weight of less than 500 causes difficulty in forming the adjacent structure of the L-lactic acid segment and the D-lactic acid segment and may form a liquid or amorphous state. On the other hand, the segment having a molecular weight of more than 300,000 causes the fluidity to be lowered and thus the formation of the adjacent structure is also difficult. The optical purity of L-lactic acid and D-lactic acid constituting the L-lactic acid segment and the D-lactic acid segment is preferably 85% ee or more and more preferably 90% ee or more. Lactic acid having an optical purity of less than 85% ee causes difficulty in forming the adjacent structure due to collapse of the symmetrical helical structures of each L-lactic acid segment and D-lactic acid segment and thus the crystallization promoting effect may deteriorate.

The blend proportion of the L-lactic acid segment and the D-lactic acid segment in the polylactic acid stereoblock copolymer is not particularly limited as long as at least one or more of each segment is copolymerized. The total number of the segments is preferably about 2 to about 2,000. The copolymer having the number of the segments of more than 2,000 results in deteriorating the effect of promoting the formation of the stereocomplex.

As a method for producing such a polylactic acid stereoblock copolymer, several methods have been conventionally developed and these methods used in the present invention are not particularly limited. For example, (1) The stereoblock copolymer including the L-lactic acid segments and the D-lactic acid segments can be obtained by sequential living ring-opening polymerization in which L-lactide and D-lactide are sequentially added in the presence of the polymerization initiator. (2) The stereoblock copolymer can be produced by melting and mixing and crystallizing the mixture of poly(L-lactic acid) and poly(D-lactic acid) having a weight average molecular weight of 5,000 or more, and thereafter extending a chain length by solid-phase polymerization at the melting temperature or lower of the crystal. (3) The stereoblock copolymer can also be produced by mixing poly(L-lactic acid) and poly(D-lactic acid) and thereafter extending the chain length by transesterification and/or dehydration condensation. (4) The stereoblock copolymer can be produced including a step of performing Diels-Alder reaction of poly(L-lactic acid) having anthracenyl groups or furanyl groups at both terminals of the polymer chain and poly(D-lactic acid) having a maleimide group at at least one terminal of the polymer chain, or a step of performing Diels-Alder reaction of poly(D-lactic acid) having anthracenyl groups or furanyl groups at both terminals of the polymer chain and poly(L-lactic acid) having a maleimide group at at least one terminal of the polymer chain. A method for obtaining poly(D-lactic acid) or poly(L-lactic acid) having anthracenyl groups or furanyl groups at both terminals of the polymer chain used herein is not particularly limited. Examples of the method include a method in which a coupling reaction of poly(L-lactic acid) having an anthracenyl group at one terminal of the polymer chain or poly (D-lactic acid) having an anthracenyl group at one terminal of a polymer chain obtained after dehydration condensation of L-lactic acid or D-lactic acid using an anthracene compound as the polymerization initiator, with a diisocyanate compound is performed; and a method in which poly(L-lactic acid) having an anthracenyl group at one terminal of the polymer chain or poly(D-lactic acid) having an anthracenyl group at one terminal of the polymer chain is obtained by ring-opening polymerization of L-lactide or D-lactide using an anthracene compound as the polymerization initiator, and thereafter coupling reaction is performed using the diisocyanate compound. The coupling reaction using the diisocyanate compound after the ring-opening polymerization of L-lactide or the dehydration condensation of L-lactic acid using an anthracene compound as the polymerization initiator allows poly(L-lactic acid) having the anthracenyl groups at both terminals to be obtained. The coupling reaction using the diisocyanate compound after the ring-opening polymerization of D-lactide or the dehydration condensation of D-lactic acid using an anthracene compound as the polymerization initiator allows poly(D-lactic acid) having the anthracenyl groups at both terminals to be obtained. The method for producing such a polylactic acid stereoblock copolymer also includes a method in which coupling reaction of poly(L-lactic acid) having a furanyl group at one terminal of the polymer chain or poly(D-lactic acid) having a furanyl group at one terminal of the polymer chain obtained after dehydration condensation of L-lactic acid or D-lactic acid using a furan compound as the polymerization initiator, using the diisocyanate compound is performed; and a method in which poly(L-lactic acid) having a furanyl group at one terminal of the polymer chain or poly(D-lactic acid) having a furanyl group at one terminal of the polymer chain is obtained by ring-opening polymerization of L-lactide or D-lactide using a furan compound as the polymerization initiator and thereafter coupling reaction is performed using the diisocyanate compound. The coupling reaction using the diisocyanate compound after the ring-opening polymerization of L-lactide or the dehydration condensation of L-lactic acid using a furan compound as the polymerization initiator allows poly(L-lactic acid) having the furanyl groups at both terminals to be obtained. The coupling reaction using the diisocyanate compound after the ring-opening polymerization of D-lactide or the dehydration condensation of D-lactic acid using a furan compound as the polymerization initiator allows poly(D-lactic acid) having the furanyl groups at both terminals to be obtained.

The thus obtained polylactic acid block copolymer has a melting point of about 100° C. to about 170° C. and a glass transition point (Tg) of about 30° C. to about 60° C.

The biodegradable resin used in the biodegradable resin composition according to the present invention is not particularly limited as described above, and each type of polylactic acid preferably used is also not particularly limited. Any of these types of polylactic acid may be used alone or as a mixture. From the viewpoint of moldability, poly(L-lactic acid) is preferable.

In addition to the above-described viewpoint, from the viewpoints of economy and easy availability, poly(L-lactic acid) is desirably used as the main component as the biodegradable resin. In the present specification, the term "main component" usually means a component occupying 50% by mass or more of the total amount of the resin component. In particular, as one preferable embodiment, poly(L-lactic acid) is included in a range of 80% by mass or more and further preferably 90% by mass or more.

In the case where polylactic acid, particularly poly(L-lactic acid), is the main component as the biodegradable resin, the other components to be blended as the resin component may include polylactic acid other than the main component type of polylactic acid and the biodegradable resins other than the polylactic acid resin as described above.

In the biodegradable resin composition according to the present invention, other thermoplastic resins may be blended. The blended amount of such other thermoplastic resins is preferably 20% by mass or less and more preferably 10% by mass or less relative to the total volume of the resin components so as not to substantially affect the biodegradability of the biodegradable resin composition according to the present invention. The particularly preferable aspect is an aspect in which no other thermoplastic resin is blended. Examples of the thermoplastic resin include polyolefin resins such as polyethylene-based resins, polypropylene-based resins, poly(methyl-1-pentene), and ethylene-cyclic olefin copolymers; functional group-containing polyolefin resins such as ethylene-vinyl acetate copolymers, ethylene-acrylic acid copolymers, ethylene-methacrylic acid copolymers, metal salts of ethylene-methacrylic acid copolymers (ionomers), ethylene-acrylic acid alkyl ester copolymers, ethylene-methacrylic acid alkyl ester copolymers, maleic acid-modified polyethylene, and maleic acid-modified polypropylene; polyamide-based resins such as nylon-6, nylon-6,6, nylon-6,10, and nylon-6,12; thermoplastic polyester resins such as aromatic polyester-based resins including polyethylene terephthalate and copolymers thereof, polyethylene naphthalate, and polybutylene terephthalate, and aliphatic polyester-based resins including polybutylene succinate and polylactic acid; polycarbonate resins such as aromatic polycarbonates and aliphatic polycarbonates; polystyrene-based resins such as atactic polystyrene, syndiotactic polystyrene, acrylonitrile-styrene (AS) copolymers, and acrylonitrile-butadiene-styrene (ABS) copolymers; polyvinyl chloride-based resins such as polyvinyl chloride and polyvinylidene chloride; polyphenylene sulfide; and polyether-based resins such as polyethersulphone, polyetherketone, and polyetheretherketone.

Heavy Calcium Carbonate Particles

In the biodegradable resin composition forming the biodegradable resin molded product according to the present invention, the heavy calcium carbonate particles are blended together with the above-described biodegradable resin composition. The heavy calcium carbonate is a product obtained by mechanically crushing and processing natural calcium carbonate as described below, and is clearly distinguished from synthetic calcium carbonate produced by chemical precipitation reaction or the like.

In the present specification, heavy calcium carbonate refers to a product produced by crushing and classifying natural calcium carbonate such as calcite (for example, limestone, chalk, and marble), shell, and coral. Limestone serving as the raw material of heavy calcium carbonate is produced in abundance in Japan with a high degree of purity and can be obtained at very low price.

Either a wet method or a dry method may be selected as the method for crushing heavy calcium carbonate in accordance with standard methods. The dry crashing without the steps such as the dehydration step and the drying step, which increase the cost, is advantageous. A crusher is also not particularly limited. An impact crusher, a crusher using a crushing medium such as a ball mill, a roller mill, and the like can be used.

The classification may be classification performed by air classification, wet cyclone, and decanter. Surface treatment may be performed in any step of before crushing, during crushing, before classification, and after classification, and is preferably performed before classification. The surface treatment before classification allows the narrower particle size distribution to be obtained in high efficiency. A part of a surface treatment agent may be added as a grinding aid before crushing or during crushing and the remaining part may be added in a later step to perform the surface treatment.

In order to enhance dispersibility or reactivity of the heavy calcium carbonate particles, the surface of the heavy calcium carbonate particles may be previously subjected to surface modification in accordance with conventional methods. Examples of the surface modification method include physical methods such as plasma treatment and a method in which the surface is subjected to chemical surface treatment with a coupling agent or a surfactant. Examples of the coupling agent include silane coupling agents and titanium coupling agents. The surfactant may be any of anionic, cationic, nonionic, and amphoteric surfactants and examples thereof include higher fatty acids, higher fatty acid esters, higher fatty acid amides, and higher fatty acid salts.

The average particle diameter of the heavy calcium carbonate particles is preferably 1.0 µm or more and 10.0 µm or less and more preferably 1.0 µm or more and 3.0 µm or less. The average particle diameter of the inorganic substance powder described in the present specification means a value calculated from the measurement result of the specific surface area by the air permeation method in accordance with JIS M-8511. As a measuring instrument, for example, a specific surface area measuring apparatus Type SS-100 manufactured by Shimadzu Corporation can be preferably used. In particular, in the particle diameter distribution, particles having a particle diameter of 50.0 µm or more are preferably excluded. On the other hand, excessively fine particles cause the viscosity at the time of kneading with the above-described biodegradable resin to significantly increase and thus production of the molded products may be difficult. Therefore, the average particle diameter is preferably set to 1.0 µm or more.

Different from light calcium carbonate and the like produced by the synthetic method, for example, surface irregularity and large specific surface area due to the particle formation by the crushing process are particularly important for the heavy calcium carbonate particles used in the present invention. As described above, there is a state where a large number of fine voids around which the biodegradable resin does not adhere to the surface of the heavy calcium carbonate particles are formed or a state where a large number of parts in which adhesion is significantly weak exist immediately after molding the molded product at the time of molding at the interface of the biodegradable resin constituting the matrix and the heavy calcium carbonate particles even without applying treatment such as stretching in particular because the heavy calcium carbonate particles blended in the biodegradable resin composition have such an amorphous shape and large specific surface area.

From this reason, the specific surface area of the heavy calcium carbonate particles is desirably 0.1 $m^2/g$ or more and 10.0 $m^2/g$ or less, more preferably 0.2 $m^2/g$ or more and 5.0 $m^2/g$ or less, and further preferably 1.0 $m^2/g$ or more and 3.0 $m^2/g$ or less. The BET adsorption method described here is in accordance with a nitrogen gas adsorption method. The heavy calcium carbonate particles having the specific surface area within this range allows the biodegradability under the natural environment to be excellently promoted in the obtained molded product because the biodegradable resin has many surfaces serving as the starting points of the biodegradation reaction from the reasons described above and thus, at the same time, deterioration in processability of the resin composition due to the blend of the heavy calcium carbonate particles to rarely occur.

The amorphousness of the heavy calcium carbonate particles can be represented by the low degree of spheroidization of the particle shape. Specifically, the roundness is desirably 0.50 or more and 0.95 or less, more preferably 0.55 or more and 0.93 or less, and further preferably 0.60 or more and 0.90 or less. If the heavy calcium carbonate particles used in the present invention have the roundness within such ranges, a state where a large number of fine voids without adhesion are formed or a state where a large number of parts where adhesion is very weak exist is likely to be formed at the interface between the biodegradable resin forming the matrix and the heavy calcium carbonate particles. Therefore, the heavy calcium carbonate particles are suitable for enhancing biodegradability under the natural environment and, at the same time, provide moderate strength and molding processability as the product.

Here, the roundness can be represented by (Projected area of particle)/(Area of a circle having the same perimeter as the projected perimeter of particle). The method for measuring the roundness is not particularly limited. For example, the projected area of the particle and the projected perimeter of the particle are measured from a micrograph and designated as (A) and (PM), respectively. When the radius of a circle having the same perimeter as the projected perimeter of the particle is designated as (r), $$PM = 2\pi r \qquad (1).$$

When the area of the circle having the same perimeter as the projected perimeter of the particle is designated as (B), $$B = \pi r^2 \qquad (2).$$

Transforming Formula (1) results in $$r = PM/2\pi \qquad (3).$$

Therefore, substituting Formula (3) into Formula (2) results in $$B = \pi \times (PM/2\pi)^2 \qquad (4).$$

Therefore, the roundness is determined as Roundness=A/B=A×4π/(PM)².

The particles to be measured are sampled so as to represent the particle size distribution of the powder. As the number of the measured particles becomes larger, the measured value becomes more reliable. In consideration of the measurement time, the roundness is said to be determined by the average value of the roundness of about 100 particles. In the present specification, the average value of the roundness of 100 particles are also used. The measurement is performed with generally commercially available image analysis software using the projection image of each particle obtained by a scanning microscope, a stereomicroscope, or the like, whereby the roundness can be determined.

The heavy calcium carbonate particles included in the biodegradable resin composition constituting the biodegradable resin molded product according to the present invention are preferably particles the surface of which is partially oxidized and in which the composition of calcium oxide is partially included in the state of the molded product. The degree of this oxidation is not particularly limited. The effect of promoting the biodegradability is obtained even at a relatively small part of the particle surface, for example, a proportion sufficiently smaller than 2% of the volume of the particles, and thus excessive oxidation is unnecessary. With respect to the partial oxidation of the surface of the heavy calcium carbonate particles included in such a molded product, the heavy calcium carbonate particles used for molding are not particularly require to be previously subjected to heat treatment or the like separately. At the time of mixing and melting the biodegradable resin and the heavy calcium carbonate particles to produce the molded product, the surface of the heavy calcium carbonate particles may be oxidized due to subjecting the heavy calcium carbonate particles to the heat history. The generation of calcium oxide on the surface of particles by oxidation can be determined and quantified by, for example, an EDTA titration method or a potassium permanganate titration method defined in HS R 9011:2006.

The blend proportion (% by mass) of the above-described biodegradable resin and the heavy calcium carbonate particles included in the biodegradable resin composition according to the present invention is not particularly limited as long as the blend proportion is in a range of 50:50 to 10:90. The proportion is preferably 40:60 to 20:80 and further preferably 40:60 to 25:75. This is because, with respect to the blend proportion of the biodegradable resin and the heavy calcium carbonate particles, the resin composition having a proportion of the heavy calcium carbonate of less than 50% by mass results in not obtaining the predetermined physical properties of the biodegradable resin molded product such as texture and impact resistance due to the blend of the heavy calcium carbonate particles, whereas the resin composition having a proportion of the heavy calcium carbonate of more than 90% by mass results in difficulty in molding processing such as extrusion molding and injection molding.

Other Additives

The biodegradable resin composition according to the present invention may be blended with other additives as auxiliary agents, if necessary. As other additives, for example, a plasticizer, a filler other than calcium bicarbonate particles, a colorant, a lubricant, a coupling agent, a fluidity improver, a dispersant, an antioxidant, a ultraviolet absorber, a flame retardant, a stabilizer, an antistatic agent, and a foaming agent may be blended. These additives may be used singly or in combination of two or more of the additives. These additive may be blended in the kneading step described below or may be previously blended in the biodegradable resin composition before the kneading step. With respect to the biodegradable resin composition according to the present invention, the amount of these other additives to be blended is not particularly limited as long as these other additives do not inhibit the desired effect due to the blend of the above-described biodegradable resin and the calcium bicarbonate particles. For example, each of these other additives is included desirably in a range of about 0 to about 5% by mass and a total of the other additives is blended in a range of 10% by mass or less in the case where the total mass of the biodegradable resin composition is 100%.

Hereinafter, among these other additives, the additives considered to be important will be described. However, the other additives are not limited thereto.

For example, in the case where poly(L-lactic acid) or poly(D-lactic acid) having a high degree of crystallinity is used as the main component as the above-described biodegradable resin, the plasticizer may be added for providing processability of the biodegradable resin and flexibility of the molded product to be obtained. Examples of the plasticizer include lactic acid, a lactic acid oligomer having a weight average molecular weight of about 3,000 or less, and branched polylactic acid (refer to, for example, WO 2010/082639).

Examples of the fillers other than the heavy calcium carbonate particles include carbonates (excluding heavy calcium carbonate), sulfates, silicates, phosphates, borates, oxides of calcium, magnesium, aluminum, titanium, iron, and zinc, or hydrates thereof in the form of powder. Specific examples include light calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, and graphite. These fillers may be synthetic fillers or fillers originated from natural minerals.

As the colorants, any of the known organic pigments, inorganic pigments, and dyes may be used. Specific examples include organic pigments such as azo, anthraquinone, phthalocyanine, quinacridone, isoindolinone, dioxazine, perinone, quinophthalone, and perylene pigments, and inorganic pigments such as ultramarine blue, titanium oxide, titanium yellow, and iron oxide (red iron oxide), chromium oxide, zinc white, and carbon black.

Examples of lubricants include fatty acid-based lubricants such as stearic acid, hydroxystearic acid, complex-type stearic acid, and oleic acid, aliphatic alcohol-based lubricants, aliphatic amide-based lubricants such as stearamide, oxystearamide, oleylamide, erucylamide, ricinolamide, behenamide, methylolamide, methylenebisstearamide, methylenebisstearobehenamide, bisamide acids of higher fatty acids, and complex-type amide, aliphatic ester-based lubricants such as n-butyl stearate, methyl hydroxystearate, polyvalent alcohol fatty acid esters, saturated fatty acid esters, and ester-based waxes, and fatty acid metal soap-based lubricants.

As the antioxidants, phosphorus-based antioxidants, phenol-based antioxidants, and pentaerythritol-based antioxidants can be used. Phosphorus-based antioxidants, more specifically, phosphorus-based antioxidant stabilizers such as phosphorous acid esters and phosphoric acid esters are preferably used. Examples of the phosphorous acid esters include triesters, diesters, monoesters of phosphorous acid such as triphenyl phosphite, trisnonylphenyl phosphite, and tris(2,4-di-t-butylphenyl) phosphite.

Examples of the phosphoric acid ester include trimethyl phosphate, triethyl phosphate, tributyl phosphate, trioctyl phosphate, triphenyl phosphate, tricresyl phosphate, tris(nonylphenyl) phosphate, and 2-ethylphenyl diphenyl phosphate. These phosphorus-based antioxidants may be used singly or in combination of two or more of the phosphorus-based antioxidants.

Examples of the phenol-based antioxidants include α-tocopherol, butylhydroxytoluene, sinapyl alcohol, vitamin E, n-octadecyl-3-(3,5-di-t-butyl-4-hydroxyphenyl) propionate, 2-t-butyl-6-(3'-t-butyl-5'-methyl-2'-hydroxybenzyl)-4-methylphenyl acrylate, 2,6-di-t-butyl-4-(N,N-dimethylaminomethyl)phenol, 3,5-di-t-butyl-4-hydroxybenzylphosphonate diethyl ester, and tetrakis[3-(3,5-di-t-butyl-4-hydroxyphenyl)propionyloxymethyl]methane. These phenol-based antioxidants may be used singly or in combination of 2 or more of the phenol-based antioxidants.

The flame retardants are not particularly limited. For example, halogen-based flame retardants, phosphorus-based flame retardants, or non-phosphorus-halogen-based flame retardants such as metal hydrates may be used. Specific examples of the halogen-based flame retardants include halogenated bisphenylalkanes, halogenated bisphenol-based compounds such as halogenated bisphenylethers, halogenated bisphenylthioethers, and halogenated bisphenylsulfone, and bisphenol-bis(alkyl ether)-based compounds such as brominated bisphenol A, brominated bisphenol S, chlorinated bisphenol A, and chlorinated bisphenol S. Examples of the phosphorus-based flame retardants include tris(diethylphosphinic acid) aluminum, bisphenol A bis(diphenyl phosphate), triaryl isopropyl phosphate compounds, cresyl di-2,6-xylenyl phosphate, and condensed aromatic phosphoric acid esters. Examples of the metal hydrates include aluminum trihydrate, magnesium dihydroxide, and a combination thereof. These flame retardants may be used singly or in combination of two or more of the flame retardants. These compounds act as flame retardant aids and can more effectively improve the flame-retardant effect. Furthermore, antimony oxide such as antimony trioxide and antimony pentoxide, zinc oxide, iron oxide, aluminum oxide, molybdenum oxide, titanium oxide, calcium oxide, and magnesium oxide can be used together as flame retardant aids.

The foaming agents are compounds that cause phase change from solid to gas or liquid to gas by mixing with or injecting with pressure into the biodegradable resin composition serving as the raw material in a melted state in a melting and kneading apparatus or gas itself, and are mainly used for controlling expansion ratio (foaming density) of a foamed sheet. As the foaming agent dissolved in the biodegradable resin composition serving as the raw material, a foaming agent that is liquid at room temperature causes phase change into gas due to the resin temperature and is dissolved in the molted resin, and a foaming agent that is gas at room temperature is dissolved in the melted resin as it is without causing phase change. The foaming agent dispersed and dissolved in the melted resin expands inside the sheet because the pressure is released at the time of extruding the molten resin from the extrusion die into a sheet-like product to provide a foamed sheet by forming many fine closed cells inside the sheet. The foaming agent secondarily acts as a plasticizer that lowers the melt viscosity of the raw material resin composition and lowers the temperature for achieving a plasticized state of the raw material resin composition.

Examples of the foaming agent include aliphatic hydrocarbons such as propane, butane, pentane, hexane, and heptane; alicyclic hydrocarbons such as cyclobutane, cyclopentane, and cyclohexane; halogenated hydrocarbons such as chlorodifluoromethane, difluoromethane, trifluoromethane, trichlorofluoromethane, dichloromethane, dichlorofluoromethane, dichlorodifluoromethane, chloromethane, chloroethane, dichlorotrifluoroethane, dichloropentafluoroethane, tetrafluoroethane, difluoroethane, pentafluoroethane, trifluoroethane, dichlorotetrafluoroethane, trichlorotrifluoroethane, tetrachlorodifluoroethane, and perfluorocyclobutane; inorganic gases such as carbon dioxide, nitrogen, and air; and water.

The content of the foaming agent included in the foaming agent in the molding step can be appropriately determined depending on the amount of the biodegradable resin and the heavy calcium carbonate particles and the like, and is preferably in the range of 0.04 to 5.00% by mass relative to the total mass of the biodegradable resin composition.

Molded Product

The molded product according to the present invention is a molded product molded using the biodegradable resin composition in which the above-described heavy calcium carbonate particles are blended in a large amount.

The shape or the like of the molded product according to the present invention is not particularly limited and may be in various forms. Various molded products, for example, sheets, container products for food and other container product, or consumable products disposed in a relatively short period of time in the fields of daily necessities, automotive parts, electric/electronic parts, and construction members can be molded.

The thickness of the molded product according to the present invention is also not particularly limited and may vary from a thin thickness to a thick thickness depending on the form of the molded product. For example, the molded product having a thickness of 40 μm to 5,000 μm and more preferably having a thickness of 50 µm to 1,000 µm is exemplified. The thickness within this range allows a molded product that has no problem of moldability and processability, does not cause thickness deviation, is uniform, and has no defect to be molded.

In Particular, in the case where the form of the molded product is a sheet, the thickness is more preferably 50 µm to 1,000 µm and further preferably 50 µm to 400 µm. A sheet having a thickness within such a range can be suitably used in place of paper or synthetic paper for general printing/information application and packaging application.

In one embodiment of the molded product according to the present invention, the members constituting the molded product may have a laminated structure. As described above, the molded product formed from the biodegradable resin composition made by blending the heavy calcium carbonate particles in a large amount has, for example, excellent mechanical strength and heat resistance. In order to provide various functionalities such as a non-migration property of the included components, scratch resistance, glossiness, and heat sealability to the surface, an aspect in which at least one surface of a layer including the biodegradable resin composition made by blending the heavy calcium carbonate particles in a large amount is covered with a surface layer, may be employed. In the case where both surfaces of the layer including the biodegradable resin composition in which the heavy calcium carbonate particles are blended are covered, the surface layers arranged on the respective surfaces may be the same or different. Other single intermediate layer or a plurality of intermediate layers may be provided between the surface layer and the layer including the biodegradable resin composition made by blending the heavy calcium carbonate particles in a large amount. The material constituting such a surface layer is not particularly limited because various materials can be used depending on the function to be provided and the like. For example, an aspect of a biodegradable resin, in particular polylactic acid, having no additives or blending significantly low amounts of additives, or petroleum-based synthetic resin such as polyolefin resins, additive-free polypropylene film layers, and additive-free polyethylene film layers, can be exemplified. The thickness of these surface layers may be sufficiently thin as compared with the thickness of the layer including the biodegradable resin composition made by blending the heavy calcium carbonate particles in a large amount and, for example, about 1 µm to about 40 µm and more preferably about 2 µm to about 15 µm. A method for covering, with the surface layer, at least one surface of the layer including the biodegradable resin composition made by blending the heavy calcium carbonate particles in a large amount is also not particularly limited. As the method, a method in which a separately prepared film for the surface layer molded by, for example, inflation molding adheres to one surface or both surfaces of the layer including the biodegradable resin composition made by blending the heavy calcium carbonate particles in a large amount by laminating processing, or a method in which, as conventionally known methods, the biodegradable composition for the surface layer is co-extruded using a two-color die or a multi-color die together with the biodegradable resin composition made by blending the heavy calcium carbonate particles in a large amount according to the present invention to mold a laminated sheet, may be employed.

Method for Producing Biodegradable Resin Molded Product

As the method for producing biodegradable resin molded product according to the present invention, common methods may be used. For example, any known molding methods such as an injection molding method, a foam injection molding method, an injection compression molding method, an extrusion molding method, a blow molding method, a press molding method, a calendar molding method, a vacuum-pressurized air molding method, an in-mold molding method, a gas press molding method, a two-color or multi-color molding method, and a sandwich molding method may be employed. In the case where the biodegradable resin composition according to the present invention includes the foaming agent and a molded product in an aspect of a foamed product is obtained, conventionally known methods including liquid phase foaming method such as injection foaming, extrusion foaming, and blow forming, or solid phase foaming methods such as bead foaming, batch foaming, press foaming, and atmospheric secondary foaming may be employed as the method for molding the foamed product as long as the foamed molded product can be molded into a desired shape.

The molding temperature at the time of molding cannot be unconditionally specified because the molding temperature varies to some extent depending on, for example, the molding method and the type of biodegradable resin to be used. For example, molding is desirably performed at a melted resin temperature of 140 to 220° C. and more preferably in the temperature range of 160 to 200° C. In such a temperature range, the biodegradable resin can be molded with excellent shape following property without being denatured.

As one preferable aspect of the method for producing the molded product according to the present invention, the method for producing the molded product in which the biodegradable resin composition made by blending the heavy calcium carbonate particles in a large amount is melted and kneaded with a twin-screw extruder at 160 to 220° C. and more preferably 170 to 190° C., and thereafter molded into an unstretched sheet-like product using a T-die.

As another preferable aspect of the method for producing the molded product according to the present invention, the method for producing the molded product in which the biodegradable resin composition made by blending the heavy calcium carbonate particles in a large amount is melted and kneaded with a twin-screw extruder at 140 to 220° C. and more preferably 160 to 200° C., and thereafter molded at a mold temperature of 20 to 110° C.

As described above, in the molding of the molded product according to the present invention, forming of a multilayer product with other resin composition is possible. The other resin composition can be applied to one surface or both surfaces of the layer including the biodegradable resin composition in which the heavy calcium carbonate particles are blended according to the present invention, or conversely, the biodegradable resin composition according to the present invention in which the heavy calcium carbonate particles are blended can be applied to one surface or both surfaces of the layer including the other resin composition, depending on the purpose.

In the case of forming the biodegradable resin composition into a sheet-like product, the sheet-like product can be stretched in the uniaxial direction, the biaxial direction, or the multiaxial direction (stretching by, for example, a tubular method) during or after the molding. However, in the present invention, an aspect of no stretching or unavoidable weak stretching so as to be substantially no stretching is preferable. In such a non-stretched or substantially non-stretched state, the molded product according to the present invention may have a structure that provides sufficient mechanical strength and, at the same time, promotes the biodegradability.

The mixing of the biodegradable resin and the heavy calcium carbonate particles in the biodegradable resin composition may be appropriately determined in accordance with the molding method (for example, extrusion molding, injection molding, and vacuum molding). For example, the biodegradable resin and the heavy calcium carbonate particles may be kneaded and melted before being charged into a molding machine from the hopper, or the biodegradable resin and the heavy calcium carbonate particles may be kneaded, melted, and at the same time, molded using the molding machine in an integrated manner. In melting and kneading, the heavy calcium carbonate particles are preferably uniformly dispersed in the biodegradable resin and, at the same time, the mixture is kneaded by applying high shear stress. For example, the mixture is preferably kneaded using a biaxial kneader.

In the method for producing the biodegradable resin molded product according to the present invention, the thermoplastic resin composition made by blending the biodegradable resin and the heavy calcium carbonate particles to be used in a predetermined proportion may be in the form of pellets or may not be in the form of pellets. In the case of the form of pellets, the shape of the pellets is not particularly limited. For example, pellets having a shape of cylinder, sphere, and ellipsoid may be formed. A pelletizing operation for obtaining the pellets can be performed by procedures or apparatuses commonly used by those skilled in the art. For example, while the biodegradable resin is being melted using a twin-screw extruder or the like, the heavy calcium carbonate particles and other additives are added and the resultant mixture is melted and kneaded, and extruded into a strand shape, and cooled. Thereafter, the pellets are produced using a pelletizer. The thus produced pellets can be used for injection molding or the like after sufficiently drying to remove water.

The size of the pellets may be appropriately determined depending on the shape. For example, in the case of the spherical pellets, the diameter may be 1 to 10 mm. In the case of the ellipsoidal pellets, the pellets may have an elliptical shape with an aspect ratio of 0.1 to 1.0 and may have vertical and horizontal lengths of 1 to 10 mm. In the case of cylindrical pellets, the diameter may be within a range of 1 to 10 mm and the length may be within a range of 1 to 10 mm. These shapes may be formed to the pellets after the kneading step in accordance with usual methods.

As clear from the crystalline polylactic acid (poly(L-lactic acid) or poly(D-lactic acid)) that can be representatively used as the biodegradable resin in the present invention with a relatively high glass transition temperature of 57 to 60° C., the main chain is significantly rigid and the crystallization rate is slow. Therefore, in the injection molding without the stretching operation, polylactic acid remains in a semi-melted state even when the mold temperature is set to 90 to 100° C. (high temperature mold), which is optimum for crystallization. Polylactic acid is eventually cooled and solidified by setting the mold temperature near room temperature (low temperature mold). However, the degree of crystallinity is extremely low and only a molded product having poor heat resistance is obtained.

On the other hand, in the biodegradable resin composition according to the present invention, the heavy calcium carbonate particles are mixed in a large blended amount relative to the biodegradable resin, and thus the molded product is sufficiently hardened even in the high temperature mold and has higher crystallinity even in the low temperature mold even when the crystalline polylactic acid (poly(L-lactic acid) or poly(D-lactic acid)) as the biodegradable resin is used as the main component. By adding the effect of the blend of the heavy calcium carbonate particles in a large blended amount, the heat resistance of the biodegradable resin composition according to the present invention becomes high as compared with the conventional composition in which the crystalline polylactic acid is used as the main component. Therefore, it is not necessary to take a sufficient time for cooling, and thus the molding cycle is shortened and the productivity is improved.

EXAMPLES

Hereinafter, the present invention will be described more specifically based on Examples. These Examples are described only for the purpose of exemplifying specific aspects and embodiments in order to facilitate the understanding of the concept and scope of the present invention disclosed in this specification and described in the appended claims. The present invention is not limited to these Examples.

Evaluation Methods

Each physical property value described in the following Examples and Comparative Examples was evaluated by the following methods.

Specific Surface Area of Particles

The specific surface area of particles was determined by a nitrogen gas adsorption method using BELSORP-mini manufactured by MicrotracBEL Corp.

Average Particle Diameter

The average particle diameter was calculated from the measurement result of a specific surface area by an air permeation method in accordance with MS M-8511 using a specific surface area measuring apparatus Type SS-100 manufactured by Shimadzu Corporation.

Roundness of Particles

So as to represent the particle distribution of powder, 100 particles were sampled. The particle image of the projection image of each of these particles obtained using an optical micrometer was subjected to image analysis using a commercially available image analysis software to determine the roundness. As a measurement principle, the projected area of the particle and the projected perimeter of the particle are measured and designated as (A) and (PM), respectively. When the radius of a circle having the same perimeter as the projected perimeter of the particle is designated as (r), $$PM = 2\pi r \quad (1).$$

When the area of the circle having the same perimeter as the projected perimeter of the particle is designated as (B), $$B = \pi r^2 \quad (2).$$

Transforming Formula (1) results in $$r = PM/2\pi \quad (3).$$

Therefore, substituting Formula (3) into Formula (2) results in $$B = \pi \times (PM/2\pi)^2 \quad (4).$$

Therefore, the roundness is determined as Roundness=A/B=A×4π/(PM)².

Weight Average Modulecular Weight (Mw))

The weight average molecular weight was determined in terms of a standard polystyrene value measured by gel permeation chromatography (GPC). As a measuring instrument, the following were used: Detector: Differential refractometer RID-6A manufactured by Shimadzu Corporation, Pump: LC-10AT manufactured by Shimadzu Corporation, and Column: Serially connected TSKgel G2000HXL, TSKgel G3000HXL, and TSKguardcolumn HXL-L manufactured by TOSOH CORPORATION. Chloroform was used as an eluent, and 10 μl of a sample having a temperature of 40° C., a flow rate of 1.0 ml/min, and a concentration of 1 mg/ml was injected.

Izon Impact Strength

The Izod impact test was performed in accordance with ASTM D256 using a test specimen having a width of 10 mm and a thickness of 3 mm at room temperature (23° C.±1° C.) under a condition with a notch.

Enzymatic Degradability Test

Preparation of CLE Enzyme Solution and Decomposition Liquid

To 10 ml of 60 mmol/l phosphate buffer solution of pH 7, 48 μl of CLE enzyme solution (lipase originated from *Cryptococcus* sp. S-2 with a lipase activity of 653 U/ml (National Research Institute of Brewing (Incorporated Administrative Agency): Japanese Patent Application Laid-open No. 2004-73123)) was added to prepare a decomposition liquid. The lipase activity was measured using para-nitrophenyl laurate as a substrate. Here, 1 U of lipase activity is defined as the amount of enzyme when 1 μmol/min of para-nitrophenol is liberated from para-nitrophenyl laurate.

Enzymatic Degradability Test

The film (30 mm×30 mm) prepared in each Example and Comparative Example and 10 ml of the above-described decomposition liquid were placed in a 25-ml vial and the vail was shaken at 58° C. and 100 rpm for 7 days. In order to avoid an extreme decrease in pH, 7 days were divided into 2 days, 2 days, and 3 days, and the decomposition liquid was exchanged at each of the divided days. After 7 days, the film was taken out and dried overnight in an oven at 45° C., and the weight was measured. The decomposition rate of the film was determined by {(Initial film weight)−(Film weight after 7 days)/Initial film weight}×100.

Seawater Degradability Test

Preparation of Artificial Seawater

Into 1 L of tap water, 36 g of dry artificial seawater (manufactured by GEX. Co., Ltd.) was dissolved to prepare artificial seawater.

Seawater Degradability Test

The film (30 mm×30 mm) produced in each Example and Comparative Example and 10 ml of the artificial seawater were placed in a 25-ml vial and the vial was shaken at 58° C. and 100 rpm for 7 days. After 7 days, the film was taken out and dried overnight in an oven at 45° C., and the weight was measured. The decomposition rate of the film was determined by {(Initial film weight)−(Film weight after 7 days)/Initial film weight}×100.

Materials

The components used in the following Examples and Comparative Examples were as follows.
Resin Component (P)
P1: Poly(L-lactic acid) (Weight average molecular weight Mw: 130,000, Melting point: 172° C.)
P2: Poly(L-lactic acid) (Weight average molecular weight Mw: 170,000, Melting point: 178° C.)
P3: Poly(L-lactic acid) (Weight average molecular weight Mw: 80,000, Melting point: 167° C.)
P4: Poly(D-lactic acid) (Weight average molecular weight Mw: 230,000, Melting point: 182° C.)
P5: Poly(DL-lactic acid) (Weight average molecular weight Mw: 150,000)
P6: Polylactic acid multi-block copolymer (Weight average molecular weight Mw: 70,000, Melting point: 140° C.)
P7: Polyglycolic acid (Weight average molecular weight Mw: 200,000, Melting point: 228° C.)
Inorganic Substance Powder (I)
I1: Heavy calcium carbonate particles→Average particle diameter: 2.2 μm, BET Specific surface area: 1.0 m²/g, Roundness: 0.85
I2: Heavy calcium carbonate particles→Average particle diameter: 1.1 μm, BET Specific surface area: 3.2 m²/g, Roundness: 0.55
I3: Heavy calcium carbonate particles→Average particle diameter: 3.6 μm, BET Specific surface area: 0.6 m²/g, Roundness: 0.9
I4: Heavy calcium carbonate particles→Average particle diameter: 8.0 μm, BET Specific surface area: 0.3 m²/g, Roundness: 0.93
Ia: Light calcium carbonate particles→Average particle diameter: 1.5 μm, BET Specific surface area: 0.1 m²/g, Roundness: 1.0
Ib: Talc particles→Average particle diameter: 3.3 μm, BET Specific surface area: 12.0 m²/g, Roundness: 0.49
Plasticizer (M) Branched Polylactic Acid Example 1

Poly(L-lactic acid) P1 was used as the resin component, heavy calcium carbonate particles I1 was used as the inorganic substance powder, and branched polylactic acid M was used as the plasticizer at the blend proportion listed in Table 1. In Table 1, the numerical value of each component is the value in part by mass. Components were charged into an extrusion molding machine equipped with a set of twin screws (T-die extrusion molding apparatus (Diameter 20 mm, L/D=25), manufactured by Toyo Seiki Seisaku-sho, Ltd.), kneaded at a temperature of 175° C., and pelletized. The obtained pellets were injection-molded at 175° C. and retained at a mold temperature of 60° C. to obtain a container-like molded product. As a result, mold releasability was excellent. A sheet having a thickness of 3 mm and a film having a thickness of 200 μm were prepared using the obtained pellets through a T-die at a temperature of 180° C. Using the test specimens prepared from the obtained sheet and film, the above-described Izod impact test, enzymatic degradability test, and seawater degradability test were performed. The obtained results are listed in Table 1.

Examples 2 to 12 and Comparative Example 1 to 4

A sheet having a thickness of 3 mm and a film having a thickness of 200 μm were prepared by the same method as the method in Example 1 except that the type and the amount of each component in the resin composition were changed from Example 1, as listed in Table 2. The Izod impact test, the enzymatic degradability test, and the seawater degradability test were similarly performed. The results are listed in Table 1.

TABLE 1

|  | Resin component (P) | Inorganic substance powder (I) | Plasticizer (M) | Izod impact test (kJ/m$^2$) | Enzymatic degradability test (%) | Seawater degradability test (%) |
| --- | --- | --- | --- | --- | --- | --- |
| Example 1 | P1/40 | I1/60 | 1 | 5.3 | 78 | 63 |
| Example 2 | P1/20 | I1/80 | 1 | 5.4 | 80 | 65 |
| Example 3 | P1/10 | I1/90 | 1 | 4.5 | 81 | 67 |
| Example 4 | P2/30 | I1/70 | 1 | 5.3 | 77 | 61 |
| Example 5 | P3/30 | I1/70 | 1 | 4.7 | 76 | 60 |
| Example 6 | P4/30 | I1/70 | 1 | 4.9 | 73 | 58 |
| Example 7 | P5/30 | I1/70 | 1 | 4.8 | 70 | 57 |
| Example 8 | P6/30 | I1/70 | 1 | 4.5 | 74 | 59 |
| Example 9 | P1/30 | I2/70 | 1 | 5.3 | 76 | 61 |
| Example 10 | P1/30 | I3/70 | 1 | 5.0 | 72 | 57 |
| Example 11 | P1/30 | I4/70 | 1 | 4.8 | 70 | 55 |
| Example 12 | P1/28 P7/2 | I1/70 | 1 | 5.5 | 75 | 60 |
| Comparative Example 1 | P1/5 | I1/95 | 1 | 2.5 | 79 | 65 |
| Comparative Example 2 | P1/60 | I1/40 | 1 | 5.1 | 40 | 25 |
| Comparative Example 3 | P1/40 | Ia/60 | 1 | 5.4 | 35 | 18 |
| Comparative Example 4 | P1/20 | Ib/80 | 1 | 5.4 | 36 | 19 |

It is found that, in Examples of thermoplastic resin composition in which the heavy calcium carbonate particles are blended according to the present invention, every example provides molded products having excellent moldability and excellent strength. In addition, with respect to the biodegradability, the molded products of Examples are improved as compared with the molded products of Comparative Examples 3 and 4.

The invention claimed is:

1. A biodegradable resin molded product comprising:
   a biodegradable resin composition comprising a biodegradable resin and heavy calcium carbonate particles in a range by mass of 50:50 to 10:90,
   wherein a BET specific surface area of the heavy calcium carbonate particles is 0.1 m$^2$/g to 3.2 m$^2$/g,
   wherein the biodegradable resin composition contains a plasticizer selected from the group consisting of lactic acid, a lactic acid oligomer having a weight average molecular weight of 3,000 or less, and branched polylactic acid, and
   wherein the biodegradable resin composition has a proportion of the plasticizer of greater than 0 to 5% by mass, based on the total mass of the biodegradable resin composition.

2. The biodegradable resin molded product according to claim 1, wherein an average particle diameter of the heavy calcium carbonate particles is 1.0 μm or more and 10.0 μm or less.

3. The biodegradable resin molded product according to claim 1, wherein a roundness of the heavy calcium carbonate particles is 0.50 or more and 0.95 or less.

4. The biodegradable resin molded product according to claim 1, wherein the heavy calcium carbonate particles are particles with a surface part thereof partially oxidized.

5. The biodegradable resin molded product according to claim 1, wherein the biodegradable resin comprises polylactic acid.

6. The biodegradable resin molded product according to claim 1, comprising a biodegradable resin composition in which the biodegradable resin comprises poly(L-lactic acid) having a weight average molecular weight (Mw) of 50,000 or more and 300,000 or less in a range of 10 to 100% by mass of entire resin components.

7. The molded product according to claim 1, wherein the molded product has a laminated structure formed by covering at least one surface of a layer comprising the biodegradable resin composition comprising the biodegradable resin and the heavy calcium carbonate particles in a range by mass of 50:50 to 10:90 with a surface layer comprising the biodegradable resin.

8. The biodegradable resin molded product according to claim 1, wherein the molded product is a sheet.

9. The biodegradable resin molded product according to claim 1, wherein the molded product is a container product.

10. A pellet comprising: a biodegradable resin composition comprising a biodegradable resin and heavy calcium carbonate particles in a range by mass of 50:50 to 10:90,
    wherein a BET specific surface area of the heavy calcium carbonate particles is 0.1 m$^2$/g to 3.2 m$^2$/g,
    wherein the biodegradable resin composition contains a plasticizer selected from the group consisting of lactic acid, a lactic acid oligomer having a weight average molecular weight of 3,000 or less, and branched polylactic acid, and
    wherein the biodegradable resin composition has a proportion of the plasticizer of greater than 0 to 5% by mass, based on the total mass of the biodegradable resin composition.

11. A method for producing a biodegradable resin molded product, the method comprising:

molding a biodegradable resin composition comprising a biodegradable resin and heavy calcium carbonate particles in a range by mass of 50:50 to 10:90 at a temperature of 20 to 110° C., wherein a BET specific surface area of the heavy calcium carbonate particles is 0.1 $m^2/g$ to 3.2 $m^2/g$, wherein the biodegradable resin composition contains a plasticizer selected from the group consisting of lactic acid, a lactic acid oligomer having a weight average molecular weight of 3,000 or less, and branched polylactic acid, and wherein the biodegradable resin composition has a proportion of the plasticizer of greater than 0 to 5% by mass, based on the total mass of the biodegradable resin composition.

12. The method for producing according to claim 11, wherein the molding is performed without stretching treatment.

13. The method for producing according to claim 11, wherein the biodegradable resin composition is melted and kneaded with a twin-screw extruder at 140 to 220° C. and thereafter molded in the form of sheet using a T-die.

14. The method for producing according to claim 11, wherein the biodegradable resin composition is melted and kneaded with a twin-screw extruder at 140 to 220° C. and thereafter molded by injecting into a mold maintained at a mold temperature of 20 to 110° C.

* * * * *